United States Patent [19]

Sakurai et al.

[11] Patent Number: 4,736,145
[45] Date of Patent: Apr. 5, 1988

[54] ELECTRIC CONTROL APPARATUS FOR EQUIPMENT

[75] Inventors: Hidetoshi Sakurai, Saitama; Tomoaki Abe; Shigeo Takemura, both of Kanagawa, all of Japan

[73] Assignee: Honda Giken Kogyo Kabushiki Kaisha, Tokyo, Japan

[21] Appl. No.: 992,023

[22] Filed: Oct. 21, 1986

[30] Foreign Application Priority Data

Oct. 21, 1985 [JP] Japan .................... 60-161707[U]

[51] Int. Cl.$^4$ ................................................ G05B 9/02
[52] U.S. Cl. ..................................... 318/563; 361/92; 361/170; 361/187; 361/190
[58] Field of Search ................ 318/563, 565, 626; 361/33, 30, 92, 170, 187, 189, 190, 90

[56] References Cited

U.S. PATENT DOCUMENTS

| | | | |
|---|---|---|---|
| 3,648,145 | 3/1972 | Meyer et al. | 361/187 |
| 3,660,730 | 4/1972 | Mason | 361/190 |
| 4,005,344 | 1/1977 | Gaind et al. | 361/92 |
| 4,023,077 | 5/1977 | Long | 361/170 |
| 4,397,368 | 8/1983 | Takeshima | 361/170 |
| 4,439,805 | 3/1984 | Tarleton | 361/92 |
| 4,649,286 | 3/1987 | Takeda et al. | 361/170 |

Primary Examiner—William M. Shoop, Jr.
Assistant Examiner—D. Martin
Attorney, Agent, or Firm—Lyon & Lyon

[57] ABSTRACT

Electric control apparatus (20) for equipment (1) comprising a driving circuit (5) for generating a signal ($S_1$) to drive the equipment as installed in a vehicle, the driving circuit including circuitry having a first specified working voltage range, and a breaking circuit (6) operatively interposed between the driving circuit and the equipment, the breaking circuit including a first switching circuit (100) for operatively interrupting the supply of the drive signal to the equipment under a condition that the supply voltage (Vdd) is lowered below a first predetermined level ($V_1$) set lower than a normal level with respect to the first working voltage range, the first switching circuit including circuitry having a second specified working voltage range not exceeding the upper limit of the first working voltage range, wherein the breaking circuit further includes a second switching circuit (10) operatively interposed between the first switching circuit and the equipment, the second switching circuit operatively interrupting the supply of the drive signal to the equipment under a condition that the supply voltage is lowered below a second predetermined level ($V_2$) set lower than the first predetermined level and higher than the lower limit of the second working voltage range.

6 Claims, 1 Drawing Sheet 4,736,145

ELECTRIC CONTROL APPARATUS FOR EQUIPMENT

BACKGROUND OF THE INVENTION

1. Field of the Invention

The present invention relates generally to electric control apparatus for controlling equipment, and more particularly to electric control apparatus having an electric circuit including a circuit element functionable within a specified range of working voltage, such as a digital integrated circuit ("IC").

2. Description of Relevant Art

In general, vehicles are equipped with various devices adapted to be driven with a drive signal depending on the traveling state, such as, for example, a fuel injector. The drive signal of such equipment is generated by electric control apparatus, at a drive circuit therein consisting of various integrated circuits ("ICs"), such as a CPU and a counter, which cooperate with each other to give the drive signal in dependence on various parameters representing the traveling state of vehicle, such as the vehicle speed, suction pressure in the intake pipe of engine, and temperature of radiator cooling water.

Such ICs as the CPU and the counter generally have a specified range of working voltage in which they can normally operate. If the supply voltage is varied lower than the lower limit of the working voltage range, the ICs are unable to operate normally, entering what is called an unstable state in which they have unstable outputs. Accordingly, the drive circuit in electric control apparatus to which power is applied from a vehicle-mounted battery fails to operate normally when the supply voltage is lowered below the lower limit of the working voltage range for a certain reason, so that the injector is unable to function.

Conventionally, it has been usual to interrupt the supply of the drive signal from the drive circuit to the injector to thereby avoid what is called a gasoline lock condition in which the injector is left open as it is injecting gasoline, when the supply voltage is lowered below the lower limit of the working voltage range. Namely, there has been employed a breaking circuit for interrupting the signal transmission from the drive circuit to the injector when the supply voltage to the drive circuit is detected to be lower than the lower limit of the working voltage range.

In this respect, if such breaking circuit has been constituted with ICs having the same working voltage range as the ICs of the drive circuit, the expected effect could not have been given. Such ICs as employed in the breaking circuit have been selected from ICs having a working voltage range with a lower limit under the lower limit of the working voltage range of the ICs constituting the drive circuit.

However, even by the provision of such consideration in the IC selection of the breaking circuit the above effect thereof can not be expected when the supply voltage is lowered below the lower limit of the working voltage range of thus selected ICs of the breaking circuit. Moreover, in such selection of ICs for the breaking circuit, the number of selectable ICs has to be limited in additional to the long time and labor needed for optimum selection, thus resulting in an increased production cost.

The present invention has been achieved to effectively solve such problems in conventional electric control apparatus for equipment.

SUMMARY OF THE INVENTION

An object of the present invention is to provide electric control apparatus for equipment in which a breaking circuit can ensure that the supply of a drive signal from a driving circuit to the equipment is interrupted when the supply voltage is lowered below the lower limit of the working voltage range of ICs constituting the breaking circuit, and which can save additional time and labor in the fabrication, thus reducing the production cost.

To achieve such object, the present invention provides electric control apparatus for equipment comprising a driving circuit for generating a signal to drive the equipment as installed in a vehicle, the driving circuit including circuitry having a first specified working voltage range, a power supply for providing a supply voltage for the driving circuit, and a breaking circuit operatively interposed between the driving circuit and the equipment, the breaking circuit including a first switching circuit for operatively interrupting the supply of the drive signal to the equipment under a condition that the supply voltage is lowered below a first predetermined level set lower than a normal level with respect to the first working voltage range, the breaking circuit including circuitry having a second specified working voltage range not exceeding the upper limit of the first working voltage range, wherein the breaking circuit further includes a second switching circuit operatively interposed between the first switching circuit and the equipment, the second switching circuit operatively interrupting the supply of the drive signal to the equipment under a condition that the supply voltage is lowered below a second predetermined level set lower than the first predetermined level and higher than the lower limit of the second working voltage range.

The above and further features, objects and advantages of the present invention will more fully appear from the following detailed description of a preferred embodiment of the invention when the same is read in conjunction with the accompanying drawings.

DETAILED DESCRIPTION OF THE PREFERRED EMBODIMENT

Figure 1:
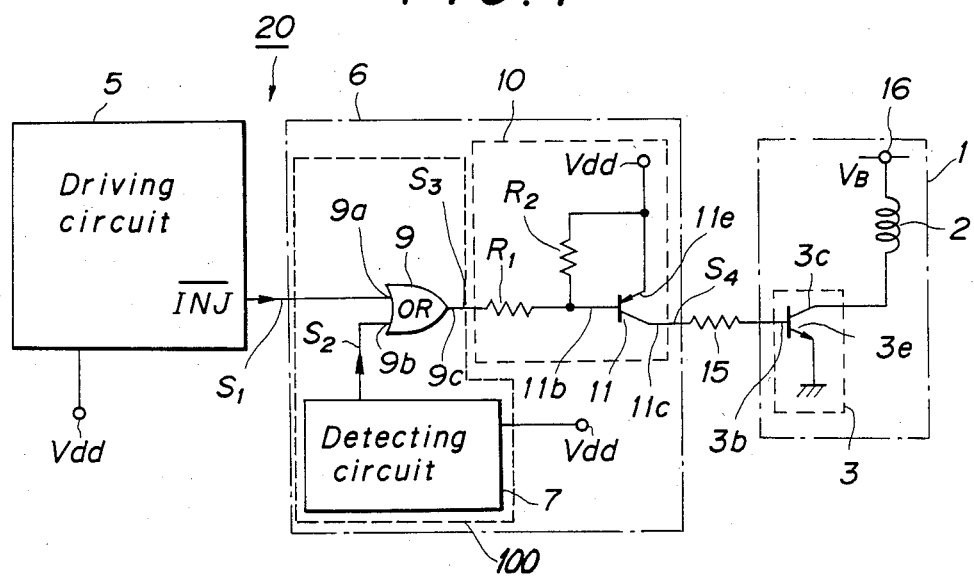
FIG. 1 is a schematic representation of the entirety of an electric control apparatus for equipment according to the present invention.
Figure 2A:
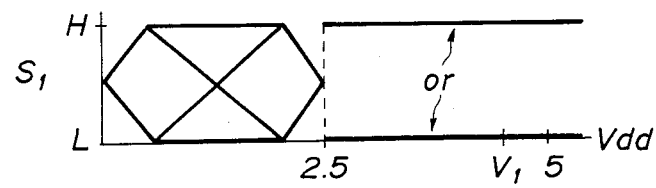
FIGS. 2A to 2D are graphs showing output characteristics of circuit elements of the apparatus of FIG. 1.
Figure 2B:
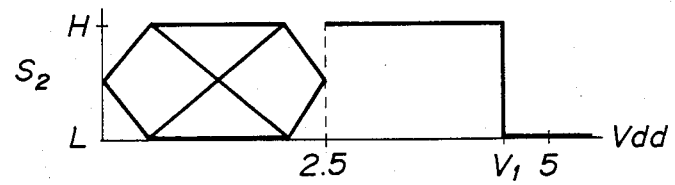
Figure 2C:
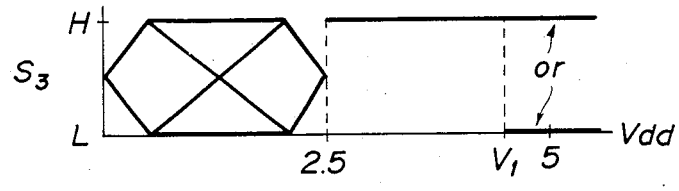
Figure 2D:
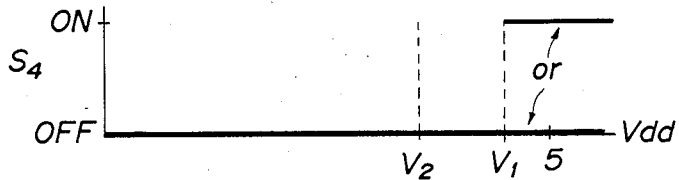

Referring now to FIG. 1, designated at reference numeral 20 is an electric control apparatus according to the present invention. The apparatus 20 is installed in an unshown vehicle to control the fuel injection of an injector 1 as an equipment in the vehicle. The injector 1 has a solenoid 2 as a valve actuator connected to a power supply 16, and is provided with a transistor 3 for switching the conduction of electric current through solenoid 2. Injector 1 is operated to feed gasoline when solenoid 2 is deenergized. The switching transistor 3 has an emitter 3e earthed and a collector 3c connected through solenoid 2 to power supply 16. Incidentally, in the Figures, represented by Vdd is a supply voltage obtained by dividing a +12 volt battery voltage of the vehicle. Supply voltage Vdd is designed to be +5 volts, when it is normal.

The control apparatus 20 includes a driving circuit 5 having a terminal $\overline{INJ}$ for outputting a negative logic signal $S_1$ to drive injector 1. Output signal $S_1$ is active at a "low" level of approx. 0 volts and inactive at a "high" level of approx. 5 volts. Circuit 5 consists of a number of unshown ICs including a CPU, a timer for counting the time of valve actions of injector 1, and a memory. The logic value of signal $S_1$ depends on various parameters of the traveling state of the vehicle, such as the vehicle speed, suction pressure in the intake pipe of the engine, and the temperature of radiator cooling water.

The driving circuit 5 is connected to a base 3b of the switching transistor 3 of injector 1, through a breaking circuit 6 and a resistor 15. Circuit 6 comprises an OR gate 9, a switching circuit 10 herein sometimes referred to as a second switching circuit, and a circuit 7 for detecting the supply voltage. The detecting circuit 7 includes unshown necessary ICs for the detection.

Respective ICs constituting the driving circuit 5 are functionable within a specified range of supply voltage Vdd (5 volts when normal), so that they have a first working voltage range of which the lower limit is 2.5 volts in the present embodiment. Likewise, respective ICs constituting the detecting circuit 7 and OR gate 9 can function within a specified range of Vdd (5 volts when normal); they have a second working voltage range of which the lower limit is 2.5 volts in the embodiment.

The detecting circuit 7 has an output signal $S_2$ thereof set "low" when the supply voltage Vdd is not lower than a first predetermined value $V_1$ (4.5 volts in the embodiment) that is lower than the normal value of 5 volts, and "high" when the voltage Vdd is lower than the value $V_1$.

The OR gate 9 receives at one terminal 9a of the two input terminals thereof the output signal $S_1$ from circuit 5 and at the other terminal 9b the output signal $S_2$ from circuit 7, and the logical sum of signals $S_1$, $S_2$ is output as a signal $S_3$ from an output terminal 9c of gate 9. The terminal 9c is connected to the switching circuit 10.

The detecting circuit 7 and OR gate 9 cooperate with each other to constitute another switching circuit herein sometimes referred to as a first switching circuit 100.

Circuit 10 comprises a pnp transistor 11 and a pair of resistors $R_1$, $R_2$. Transistor 11 has a base 11b fed with signal $S_3$ input from OR gate 9 through resistor $R_1$, an emitter 11e connected to power supply Vdd, and a collector 11c connected through resistor 15 to base 3b of the switching transistor 3 of injector 1, to supply an output signal $S_4$ to the injector 1. Base 11b and emitter 11e of transistor 11 are interconnected with each other through resistor $R_2$.

The transistor 11 goes on and off in depending on the voltage between collector and base thereof when the voltage between emitter and base thereof is not lower than 0.6 volts. When the voltage between emitter and base is lower than 0.6 volts, transistor 11 is kept off. The resistor $R_1$ has a preset resistance ratio to the resistance $R_2$ such that $R_1:R_2=2.9:0.6$. Accordingly, the voltage between emitter and base of transistor 11 is not lower than 0.6 volts when supply voltage Vdd is 3.5 volts or higher. Under such condition, the switching circuit 10 has the output voltage $S_4$ supplied through resistor 15 to injector 1 in dependence on the level of input signal $S_3$ from OR gate 9, so that injector 1 functions to open and close, as required. If supply voltage Vdd falls below 3.5 volts, the voltage between emitter and base of transistor 11 becomes lower than 0.6 volts, so that transistor 11 is kept off irrespective of the state of input signal $S_3$ from gate 9. Under such condition, the supply of drive signal $S_1$ to injector 1 is interrupted in an operative manner, so that injector 1 is kept from operating. The value of 3.5 volts is set as a predetermined second level $V_2$ lower than the first predetermined level $V_1$ (4.5 volts) and higher than the lower limit (2.5 volts) of the second working voltage range.

The circuit elements 5, 9, 7, 11 of control appartus 20 have their output characteristics represented by graphs of FIGS. 2A to 2D, respectively.

As seen from these Figures, output signal $S_2$ of circuit 7 is "low" when supply voltage Vdd is near the normal level (5 volts) with respect to the first working voltage range, so output signal $S_3$ of gate 9 depends on output signal $S_1$ of circuit 5. Moreover, the voltage between emitter and base of transistor 11 is higher than 0.6 volts, so also signal $S_4$ depends on signal $S_1$. Accordingly, if the signal $S_1$ is active ("low"), the signal $S_4$ is "high", with transistor 3 turned on. Thus, solenoid 2 is energized, operating injector 1. As a result, the injecotr 1 is controlled by the drive signal $S_1$ from circuit 5.

If supply voltage Vdd has a lowered level between the first predetermined level $V_1$ (4.5 volts) and the second predetermined level $V_2$ (3.5 volts) for a certain reason, output signal $S_2$ of circuit 7 becomes "high", so output signal $S_3$ of gate 9 takes "high" level irrespective of the state of signal $S_1$. Thus, although the voltage between emitter and base of transistor 11 is not lower than 0.6 volts under such condition, the transistor 11 is kept off because signal $S_3$ is "high". As a result, the supply of drive signal $S_1$ to injector 1 is operatively interrupted.

When supply voltage Vdd is lowered under the second predetermined level $V_2$ (3.5 volts), the voltage between emitter and base of transistor 11 is lower than 0.6 volts, so the transistor 11 is off and the supply of drive signal $S_1$ to injector 1 is interrupted. Also in the case voltage Vdd falls below the lower limit (2.5 volts) of the second working voltage range, the result is the same.

In the control apparatus 20, the supply voltage detecting circuit 7 and OR gate 9 in the breaking circuit 6 cooperate with each other to operatively interrupt the supply of drive signal $S_1$ to injector 1, when supply voltage Vdd is lowered below the first predetermined level $V_1$ (4.5 volts) that is preset lower than the normal level (5 volts) with respect to the first working voltage range. In this respect, the supply of drive signal $S_1$ to injector 1 is operatively interrupted by the switching function of transistor 11 when supply voltage Vdd is lowered below the second predetermined level $V_2$ (3.5 volts) that is preset lower than the first predetermined level $V_1$ (4.5 volts) and higher than the lower limit (2.5 volts) of the second working voltage range.

Accordingly, it is ensured that the supply of drive signal $S_1$ from circuit 5 to injector 1 is interrupted, even when supply voltage Vdd is lowered below the lower limit of the second working voltage range of the ICs constituting the detecting circuit 7 and OR gate 9.

Moreover, the switching circuit 10 consisting of the elements 11, $R_1$, $R_2$ is simple in constitution and can be easily designed in accordance with characteristics of the gate 9 and ICs constituting the circuits 5, 7. Therefore, the freedom in selection of the ICs of circuits 5, 7 is greatly improved, effectively saving additional time and labor for optimum selection, resulting in a reduced production cost of breaking circuit 6 as well as of control apparatus 20.

It will be understood that the levels $V_1$, $V_2$ may be arbitrarily changed, providing that:

$$L(Vw_2) < V_2 < V_1 < N(Vw_1),$$

where
 $L(Vw_2)$ is the lower limit (2.5 volts) of the second working voltage range; and
 $N(Vw_1)$ is the normal level (5 volts) with respect to the first working voltage range.

Although there has been described what is at present considered to be the preferred embodiment of the invention, it will be understood that the present invention may be embodied in other specific forms without departing from the spirit or essential characteristics thereof. The present invention is therefore to be considered in all respects as illustrative but not restrictive. The scope of the invention is indicated by the appended claims rather than by the foregoing description.

We claim:

1. Electric control apparatus for equipment comprising a driving circuit for generating a signal to drive the equipment as installed in a vehicle, said driving circuit including circuitry having a first specified working voltage range, a power supply for providing a supply voltage for said driving circuit, and a breaking circuit operatively interposed between said driving circuit and the equipment, said breaking circuit including a first switching circuit for operatively interrupting the supply of said drive signal to the equipment under a condition that the supply voltage is lowered below a first predetermined level set lower than a normal level with respect to said first working voltage range, said breaking circuit including circuitry having a second specified working voltage range not exceeding the upper limit of said first working voltage range, wherein:
 said breaking circuit further includes a second switching circuit operatively interposed between said first switching circuit and the equipment, said second switching circuit operatively interrupting the supply of said drive signal to the equipment under a condition that the supply voltage is lowered below a second predetermined level set lower than said first predetermined level and higher than the lower limit of said second working voltage range.

2. Electric control apparatus according to claim 1, wherein:
 said second working voltage range is equal to said first working voltage range.

3. Electric control apparatus according to claim 1, wherein:
 said second switching circuit comprises a pnp transistor having an emitter thereof connected to said power supply and a collector thereof connected to the equipment, a first resistor for interconnecting an output terminal of said first switching circuit with a base of said transistor, and a second resistor for interconnecting said emitter and said base with each other; and
 said first and said second resistors have a resistance ratio therebetween preset such that said transistor is non-conductive under a condition that the supply voltage is lowered below said second predetermined level.

4. Electric control apparatus according to claim 1, wherein:
 said first switching circuit comprises a supply voltage detecting circuit for ouputting a signal which takes a logically interrupting state under a condition that the supply voltage is lowered below said first predetermined level, and a logic circuit having said drive signal from said driving circuit and said output signal from said detecting circuit input thereto and an output terminal thereof connected to said second switching circuit; and
 said detecting circuit includes circuitry having said second working voltage range, and said logic circuit has said second working voltage range.

5. Electric control apparatus according to claim 1, wherein:
 the equipment comprises an actuator, and switching means for operating said actuator in dependence on said drive signal from said driving circuit.

6. Electric control apparatus according to claim 1, wherein:
 the equipment comprises an injector for injecting fuel.

* * * * *

UNITED STATES PATENT AND TRADEMARK OFFICE
CERTIFICATE OF CORRECTION

PATENT NO. : 4,736,145

DATED : April 5, 1988

INVENTOR(S) : Hidetoshi Sakurai et al.

It is certified that error appears in the above-identified patent and that said Letters Patent is hereby corrected as shown below:

TITLE PAGE:

Please add the Co-Assignee "Matsushita Electric Industrial Co., Ltd." to the subject patent.

Signed and Sealed this

Twenty-first Day of May, 1991

Attest:

HARRY F. MANBECK, JR.

Attesting Officer

Commissioner of Patents and Trademarks